E. P. JOHNSON.
DIRECTION INDICATOR FOR BICYCLES.
APPLICATION FILED APR. 6, 1920.
1,347,334.
Patented July 20, 1920.
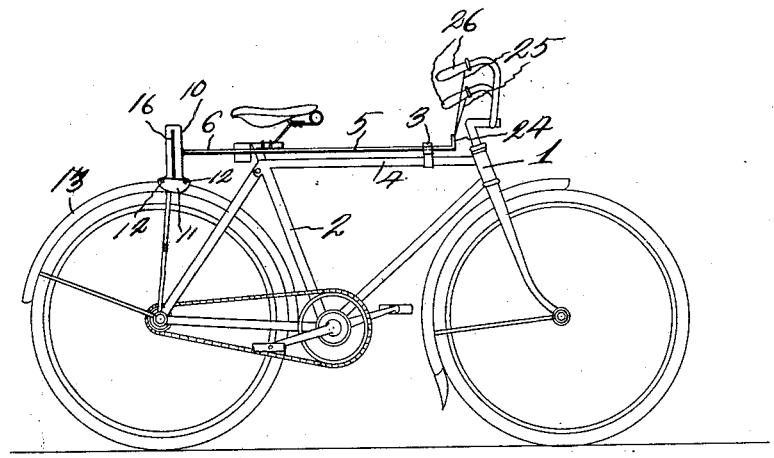
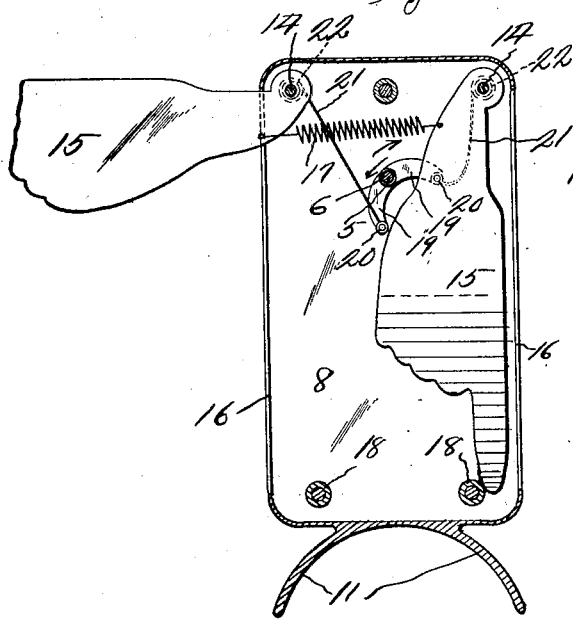
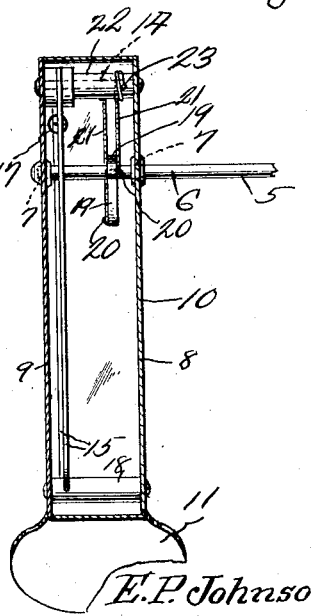
Inventor
E. P. Johnson.
By D. Swift
Attorney

UNITED STATES PATENT OFFICE.

EDMISTON P. JOHNSON, OF DECATUR, ILLINOIS.

DIRECTION-INDICATOR FOR BICYCLES.

1,347,334.

Specification of Letters Patent.

Patented July 20, 1920.

Application filed April 6, 1920. Serial No. 371,709.

*To all whom it may concern:*

Be it known that I, EDMISTON P. JOHNSON, a citizen of the United States, residing at Decatur, in the county of Macon, State of Illinois, have invented a new and useful Direction-Indicator for Bicycles; and I do hereby declare the following to be a full, clear, and exact description of the invention, such as will enable others skilled in the art to which it appertains to make and use the same.

The invention relates to direction indicators for bicycles and has for its object to provide a direction indicator wherein a pair of pivoted pointers are disposed in a casing on the mud guard of the rear wheel of the bicycle, or in any other convenient position to the rear of the bicycle so that the direction of turn of the bicycle may be indicated to vehicles approaching the bicycle from the rear and from the front. Also to provide an operating rod provided with a handle member, which handle member is located adjacent the handle bars of the bicycle and within easy reach of the operator.

A further object is to provide the pivoted direction arms with a coiled spring connection, which connection returns the arms to normal position when the operating handle is released, said indicating arms being limited in their inward movement toward each other.

A further object is to provide the operating shaft with a pair of arms, which arms have secured to their ends flexible members which members pass around drums carried by the pivoted indicator arm so that the arms may be moved on their pivotal points during the operation of the operating rod.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of bicycle showing the device applied thereto.

Fig. 2 is a transverse sectional view through the indicator casing showing one of the pointers in actuated position.

Fig. 3 is a side elevation of the casing showing the casing broken away to show the interior mechanism.

Referring to the drawings, the numeral 1 designates a conventional form of bicycle and 2 the frame thereof. Rotatably mounted in the bearing 3 of a bracket carried by the bar 4 is an operating rod 5. The rear end 6 of the operating rod 5 is rockably mounted in bearings 7 in the front and rear faces 8 and 9 of the casing 10, said casing being rectangular shaped and provided with a bracket 11 adapted to be secured as at 12 to the mud guard 13 of the rear wheel. The casing 10 has pivotally mounted therein on pins 14, indicator arms 15, which indicator arms are adapted to be moved outwardly through the slot 16 in the casing 10 as desired so as to indicate to a vehicle following the direction of turn of the bicycle. The outward movement of the arms 15 being against the tension of a coiled spring 17 the ends of which are secured to the arms 15 at points below the pivotal points 14 so that said arms will be normally maintained within the casing 10 and in engagement with the spacing sleeves 18. It also forms means whereby only one arm will be operated at the same time, therefore avoiding confusion.

The operating rod 5 at a point within the casing is provided with outwardly and downwardly curved arms 19 to the ends of which are secured as at 20, flexible cords or wires 21, the other ends of said wires passing around the drums 22 carried by the indicator arms and have their ends secured to said drums as at 23 so that when either of the arms 19 is rotated downwardly by a partial rotating of the operating rod 5 the indicator arm on the side of the casing corresponding to the downwardly moved arm 19 will move outwardly through the slot 16 in the casing to indicate the direction of turn, said operated arm being returned to normal when the operating rod is released by means of the coiled spring 17.

The forward end of the operating rod 5 is provided with a handle member 24 which may be grasped by the operator for operating the indicator if so desired, however, cords 25 may be attached to the handle member 24 and to the handle bar grips 26 so that the operator can operate the signal by one finger of his hand, preferably by the thumb.

From the above it will be seen that a direction indicator is provided for bicycles, wherein the structure is simple, the mechanism positive in its action and one wherein the signal may be operated from adjacent the handle bars. It will also be seen that the operating mechanism leading from the indicator arm casing is so positioned as to not interfere with the action of the legs of the cyclist.

The invention having been set forth what is claimed as new and useful is:—

The combination with a bicycle, of a direction indicator therefor, said direction indicator comprising a casing adapted to be secured to the mudguard of the rear wheel, indicator arms having their upper ends pivoted in the upper end of the casing at each side thereof, a spring connected to the indicator arms at points below their pivotal points, limiting stops for limiting the inward movement of the arms, a rockable operating shaft disposed in the casing at a point between the indicator arms, said rockable shaft being provided with outwardly extending arms, drums carried by the indicator arms at their pivotal points, flexible connections between the operating rod arms and the drums whereby said drums may be rotated as either arm is moved downwardly and means for operating the rotatable operating shaft from adjacent the handle bars of the bicycle.

In testimony whereof I have signed my name to this specification in the presence of two subscribing witnesses.

EDMISTON P. JOHNSON.

Witnesses:
LEE L. BAILEY,
C. A. GEARISH.